3,149,039
THIN FILM COATING FOR TABLETS AND THE LIKE AND METHOD OF COATING
Sampson F. Jeffries, Indianapolis, Ind., assignor to The Dow Chemical Company, Midland, Mich., a corporation of Delaware
No Drawing. Filed Oct. 3, 1961, Ser. No. 142,518
8 Claims. (Cl. 167—82)

This invention relates to tablets and other individual dosage forms which are characterized by a thin film coating of a water-permeable plastic composition, and to the method of making such tablets and dosage forms. The invention also relates to an improved, thin, water-permeable tablet coating film, and to a liquid composition useful for laying down the aforementioned film.

Various film coatings have been employed heretofore, but each of the known coatings tends to leave something to be desired. Some coating compositions deposit too little material and build-up is very slow. Other coatings mask embossing or score marks on tablets, make the tablets too tacky during drying, or do not form a smooth, adherent coat on the tablets. More specifically, in the coating of tablets with polyethylene glycols having molecular weights in the range of 3,000 to 7,500, the difficulty encountered is that the polyethylene glycol coating is too soft and abrades away under the friction of the load in a production-size batch in a large drying pan. It is, therefore, a principal objective of the present invention to overcome the difficulties encountered in using the known coating compositions, and to provide an improved coating which is smooth, tough and resilient and which is not subject to rapidly destructive abrasion in the coating pan.

According to the present invention, there is now provided a tablet coating composition which is comprised of a major portion of a water-soluble polyethylene glycol having a molecular weight in the range of about 3,000 to 7,500, and a relatively small portion of gum mastic. Several other ingredients may be added to the previously-named ingredients in order to enhance the properties of the coating obtained from the composition. Among the more important of these additional materials are plasticizing agents, opaquing agents and coloring agents.

The polyethylene glycols used in the present composition are polymers having molecular weights in the range of about 3,000 to 7,500. These polymers are white, waxy solids which are soluble in water, as well as in many of the more polar non-aqueous solvents, or in mixtures of the more polar solvents with non-polar organic solvents. They have freezing points in the range of about 50° to 65° C. Several particularly suitable polymers are available. One is sold as Polyglycol E–6000. Two others are sold under the trademark Carbowax and are designated, respectively, as "Carbowax 4000" and "Carbowax 6000." Of these, Polyglycol E–6000 and Carbowax 6000 are to be preferred as providing the more abrasion-resistant coating.

Gum mastic, hereinafter called "mastic," is the concrete resinous exudation from *Pistacia lentiocus* Linné (Fam. Anacardiaceae), the specifications for which are set forth in the eleventh edition of the National Formulary, under the title "Mastic."

Suitable plasticizing agents include diethyl phthalate, castor oil, corn oil, sesame oil and propylene glycol, as well known in the art. A particularly suitable plasticizing agent is a combination of about 1 part of diethyl phthalate per 2 parts of castor oil.

Among the coloring agents which may be used in the practice of this invention are any of the non-toxic dyes, lakes and pigments which can be dissolved in, or otherwise dispersed in, the solvent employed in the coating composition, and which have been certified for use in the food, drug and cosmetic industries as D. and C., or F. D. and C. colorants. For example, it has been found that dyes of the type represented by red F. D. and C. #3, green F. D. and C. #2, yellow F. D. and C. # 5, violet F. D. and C #1, red D. and C. #35, orange D. and C. #17 and green D. and C. #6 are suitable for use as colorants in the coating composition. Among the pigments which are suitable are Mapico Yellow AN-1 (yellow hydrated iron oxide), Mapico Brown AN-18 (brown hydrated iron oxide), Mapico Red AN-3 (red iron oxide) and Raven #15 Black (carbon black).

Many lakes are found suitable in the practice of this invention. A lake is a dye which has been precipitated on an insoluble metal compound. To meet Food and Drug Administration requirements, it is necessary to deposit one of the acceptable dyes on a pharmaceutically acceptable carrier such as aluminum hydroxide. As an example, F. D. and C. Red #3 may be deposited on aluminum hydroxide.

When the tablet coating composition is applied according to the process of the invention, it is possible to provide a suitable coating for a tablet or the like with the use of a relatively few coats or applications of the coating material. A highly important advantage of this invention, as indicated hereinabove, is that the coating does not abrade off of the tablets in an uneven unsatisfactory manner during the tumbling of a production batch of tablets in a coating pan during the coating process. The initial coats applied to dosage forms, using the present composition, produces a smooth coating which is not chipped or abraded off while tumbling the dosage forms during the drying period between the application of new coats. As a consequence, a smooth, handsome coated tablet or other dosage form is readily obtained. Usually, a thinner build-up of multiple coats suffices to give adequate coverage of the dosage forms, since edges or corners receive and retain a full coat at each application. This results in important savings in time and materials. Hence, it is possible to completely coat a tablet in a matter of minutes with an average of from about six to eight coatings, though more coats may be used if desired.

Even when the coating composition claimed herein is applied without coloring agent, a tablet of pleasing appearance is obtained having a colorless coating. An opaque coating may be obtained by the addition of a quantity of titanium dioxide to the composition, if desired, as by triturating or milling the requisite amount with the coating composition. Examples of other opaquing agents are: Calcium carbonate, precipitated, U.S.P., and kaolin, N.F.

The invention is most highly suitable, however, to the application of colored film coatings of the type described in which a small quantity of a suitable coloring agent, such as the dyes, pigments and lakes previously set forth, or a mixture thereof with an opaquing agent, is incorporated into the solution prior to application on the tablets. In this manner, a highly pleasing appearance is given to the tablets and the tablets may be regarded as "elegant" in the terms of the trade. The film of this invention very effectively coats the tablets so that no unpleasant taste can be perceived, but at the same time, distinctive markings punched into the tablet core will show through very clearly and be readily discernible on the surface.

In carrying out the process of the present invention, the coating composition is conveniently first prepared as two separate solutions. The first solution consists of the water-soluble polyethylene glycol dissolved in a suitable volatile, non-aqueous solvent such as alcohol, acetone, methylethyl ketone, ethyl acetate, methylene dichloride or benzene, or a mixture of any of the foregoing, such as alcohol (ethanol) and acetone mixed in proportions of about 1:1, or a mixture of one of these with yet another organic solvent. About a 42–58% w./v. solution is prepared, preferably about a 50% w./v. solution. Usually about 4–8% w./v. of a plasticizing agent, which may be a plasticizer or a mixture of plasticizers, is added to this solution.

The second solution consists of mastic dissolved in a suitable volatile non-aqueous solvent such as ethanol. The solvent used in preparing this solution must be miscible with the solvent used for the first solution and further, must not form a mixture, with the solvent of the first solution, in which the requisite amount of polyethylene glycol is insoluble. Therefore, the preferred solvents are those usable in preparing the first solution. About a 9–11% w./v. solution of mastic is prepared, preferably a 10% w./v. solution. In making up the composite fluid composition which is applied to the tablets, mixtures of from 2.5 to 10 parts by volume of the solution of the polyethylene glycol per part by volume of the mastic solution are measured out and admixed.

The concentrations of the polyethylene glycol and of mastic in their separate solutions may be varied only over rather small ranges, since solutions appreciably more concentrated than those set forth above tend to be quite viscous, while substantially more dilute solutions are of greatly diminished value in building up a film coating on tablets at an appreciable rate. However, within the limitations of the physical properties of the separate solutions, the concentrations in the separate solutions may be varied somewhat, providing the final composite fluid coating solution contains from about 35–45% w./v. of the water-soluble polyethylene glycol and from about 0.9–2.9% w./v. of mastic.

The finished dry coating on the tablet contains from about 84–89% by weight of the water-soluble polyethylene glycol, from about 1.8–6.8% by weight of mastic and up to about 13% by weight of a plasticizer. Preferably, the coating contains about 87% by weight of the polyethylene glycol, about 3.5% by weight of mastic and about 9.4% by weight of a plasticizer. The percent by weight of additives such as colorants is quite small and usually does not exceed several percent by weight in total amount.

Color compositions according to the invention may be prepared by admixing one or more of the acceptable coloring agents with the present composite coating solution. Suitable proportions of coloring agent and coating solution are illustrated in tabular form.

| Coloring Agent | | Volume of Coating Solution, ml. | Method of Mixing |
|---|---|---|---|
| Kind | Weight, mg. | | |
| F.D. & C. Green #2 | 50 | 100 | Stir to dissolve. |
| F.D. & C. Yellow #11 | 50 | 100 | Mill or stir vigorously. |
| Aluminum Lake of F.D. & C. Red #3. | 100 | 100 | Triturate or ball mill. |
| Mapico Red AN-3 (iron oxide). | 200 | 100 | Do. |
| Titanium Oxide | 1,000 | | |

The expressions "w./v." and "v./v." are used herein for their customary meaning as understood in the pharmaceutical industry. The expression "w./v." means weight per volume, i.e. the weight in grams of ingredient per 100 milliliters of suspension or solution. The expression "v./v." means volume of ingredient per unit volume of suspension or solution.

Example 1

A tablet coating solution is made up in two parts according to the following formula.

Solution A:
    Carbowax 6000 polymer _____grams__ 60
    Castor oil _____milliliters__ 4.5
    Diethyl phthalate _____do____ 2
    Denaturated alcohol, q.s. _____do____ 120
    Dissolve by gently warming and agitation.

Solution B:
    Mastic, N.F. _____grams__ 10
    Denaturated alcohol, q.s. _____milliliters__ 100
    Dissolve by agitation. Filter or decant from the small amount of foreign material.

6,250 milliliters of Solution A and 1,250 milliliters of Solution B are mixed and applied to a moving bed of about 250 pounds of 0.5 gram tablets by rapidly pouring small portions (e.g. 100–200 milliliters) onto the tablets. As the tablets rotate, the material is distributed evenly over the surface thereof and in a few minutes time, the solvents will have evaporated, leaving a dried, hard film. A stream of warm air is then directed on the moving bed of tablets for several minutes. During and at the conclusion of this drying step, the tablets are inspected visually, and it is found that the coating on the tablets is not abraded at the edges of the tablets and that the tables are considerably rounded and smoothed by the initial coat. Thereafter, a second coat is applied in the same manner and subsequent coats are applied until a total of six to eight coats have been applied over a period of about 20 minutes. A short additional drying time of 20 to 30 minutes after removal of the tablets from the coating pan assures completion of drying and removal of residual solvent odors.

Tablets coated in this manner are pleasing in appearance, the coating is smooth and the edges of the tablets are fully rounded and coated. Further disintegration tests carried out on the so-coated tablets show that the film coating thereon will disintegrate in a short time either in water or gastric secretions.

Example 2

In a manner similar to that described in Example 1, a composite fluid tablet coating composition is prepared consisting of 1,200 milliliters of Solution A and 480 milliliters of Solution B. These quantities of Solution A and Solution B are mixed and applied to a moving bed of about 130 pounds of 0.6 gram tablets by pouring small portions onto the tablets until an average of about eight coats have been applied.

The coated tablets present a smooth, pleasing appearance and show no evidence of chipping or abrading of any part of the coating.

Example 3

In a manner similar to that described in Example 1, a composite fluid tablet coating composition is prepared consisting of 4,800 milliliters of Solution A and 480 milliliters of Solution B. These quantities of Solution A and Solution B are mixed and applied to a moving bed of about 200 pounds of 0.5 gram tablets by pouring small portions onto the tablets until an average of about eight coats have been applied.

The coated tablets present a smooth, pleasing appearance and show no evidence of chipping or abrading of any part of the coating.

Example 4

A tablet coating solution is made up in two parts according to the following formula.

Solution A:
- Carbowax 4000 polymer _____ grams__ 60
- Castor oil _____ milliliters__ 4.5
- Diethyl phthalate _____ do____ 2
- Denatured alcohol, q.s. _____ do____ 120
- Dissolve by gently warming and agitation.

Solution B:
- Mastic, N.F. _____ grams__ 10
- Denatured alcohol, q.s. _____ milliliters__ 100
- Dissolve by agitation. Filter or decant from the small amount of foreign material.

6,250 milliliters of Solution A and 1,250 milliliters of Solution B are mixed and applied to a moving bed of about 250 pounds of 0.5 gram tablets by rapidly pouring small portions onto the tablets. As the tablets rotate, the material is distributed evenly over the surface thereof and in a few minute's time, the solvents will have evaporated, leaving a dried, hard film. A stream of warm air is then directed on the moving bed of tablets for several minutes. During and at the conclusion of this drying step, the tablets are inspected visually and it is found that the coating on the tablets is not abraded at the edges of the tablets and that the tablets are considerably rounded and smoothed by the initial coat. Thereafter, a second coat is applied in the same manner and subsequent coats are applied until an average of seven coats have been applied over a period of about 20 minutes. A short additional drying time of 20 to 30 minutes after removal of the tablets from the coating pan assures completion of drying and removal of residual solvent odors.

Tablets coated in this manner are pleasing in appearance, the coating is smooth and the edges of the tablets are fully rounded and coated. Further, disintegration tests carried out on the so-coated tablets show that the film coating thereon will disintegrate in a short time either in water or in gastric secretions.

In a more preferred embodiment of the process of the present invention, the present coating composition is applied to tablets which have been initially coated with a tablet coating composition containing cellulose acetate phthalate and a very high molecular weight polymer of ethylene oxide. This latter composition is the subject of a co-pending application Ser. No. 135,772, filed September 5, 1961.

In the said co-pending application, there is described a liquid tablet coating composition comprising from about 2–3% w./v. of a water-soluble ethylene oxide polymer having a molecular weight in the range of about 200,000 to 5 million, from about 5–7% w./v. of cellulose acetate phthalate, and a plasticizing agent, dissolved in a volatile non-aqueous solvent and usually containing a colorant. It has now been found that this composition is very advantageously applied to tablet cores as an initial coat, which very effectively seals the pores of tablet cores and provides a smooth base for further coating. Usually one to two coats, applied as well understood in the art, are sufficient, though more may be used if desired.

Then from about two to six, or more, coats of the present composition are applied to the "sealed" tablet to build up the total coating thickness rapidly, and the tablet is then finished off by the final application of, preferably, not more than one to two coats of the first composition containing cellulose acetate phthalate and the high molecular weight polyethylene oxide polymer. The final coating serves to impart a glossier and somewhat harder finish to the so-coated tablets.

Example 5

As an example of the preferred method of the invention, 30,000 tablets weighing 0.5 gram each are coated as follows:

A 300 milliliter quantity of a 5% w./v. solution of Polyox WSR–35 (very high molecular weight polyethylene oxide polymer) dissolved in 1:1 alcohol-acetone is admixed with a 300 milliliter quantity of a 12% w./v. solution of cellulose acetate phthalate dissolved in 1:1 alcohol-acetone and containing 1.5% v./v. of diethyl phthalate and 5% v./v. of castor oil. One-fourth (about 150 milliliters) of the resulting coating solution is applied to a moving bed of the tablets in a coating pan to give the tablets an initial coat. After several minutes of tumbling the tablets, warm air is directed on the moving bed for about two minutes to dry the tablets. A second coat is applied to the tablets in the same manner.

890 milliliters of a 50% w./v. solution of Polyglycol E–6000 dissolved in alcohol and containing 4.5% v./v. of castor oil and 2% v./v. of diethyl phthalate, is admixed with 180 milliliters of a 10% w./v. solution of mastic dissolved in alcohol. The resulting coating solution is used to apply an average of about six to eight additional coatings to the initially-coated tablets. Coating is carried out in a coating pan in a similar manner to the application of the first coats.

Finally, the remaining half (300 milliliters) of the initially-used coating solution is colored by dissolving therein 150 milligrams of F.D. and C. Green #2. The colored coating solution is used to apply two finish coats to the partially-coated tablets in the same manner described for the initial coats.

The resulting tablets are particularly smooth and handsome and uniform in color. Disintegration tests carried out on the so-coated tablets show that the composite film coating applied according to the process of the invention will disintegrate in a short time, either in water or gastric secretions.

The method of the foregoing example is especially of advantage in coating tablets whose surface is more soft and pourous than normal because of light compression and the use of low amounts of lubricants, especially stearates. Such conditions exist in "chewable" and "melt in the mouth" tablets, particularly those containing mannitol.

I claim:

1. A fluid composition adapted for application to tablets and the like which consists essentially of from about 35 to 45% w./v. of a water-suluble polyethylene glycol having a molecular weight in the range of about 3,000 to 7,500 and from about 0.9 to 2.9% w./v. of mastic, dissolved in a volatile non-aqueous solvent.

2. A fluid composition adapted for application to tablets and the like which consists essentially of 35 to 45% w./v. of a water-soluble polyethylene glycol having a molecular weight in the range of about 3,000 to 7,500, about 0.9 to 2.9% w./v. of mastic and about 2.8 to 7.3% w./v. of a plasticizing agent dissolved in a volatile non-aqueous solvent.

3. A fluid composition adapted for application to tablets and the like which consists essentially of about 41.7% w./v. of a water-soluble polyethylene glycol having a molecular weight in the range of about 3,000 to 7,500 and about 1.7% w./v. of mastic, dissolved in alcohol.

4. A coated tablet having as the coating material a thin film consisting essentially of from about 13 to 50 parts by weight of a water-soluble polyethlene glycol, having a molecular weight in the range of from about 3,000 to 7,500, per part of mastic.

5. A coated tablet having as the coating material a thin film consisting essentially of from about 13 to 50 parts by weight of a water-soluble polyethlene glycol, having a molecular weight in the range of from about 3,000 to 7,500, per part of mastic, and up to about 13% by weight of a plasticizing agent.

6. A coated tablet having as the coating material a thin film consisting essentially of about 25 parts by weight of a water-soluble polyethlene glycol, having a molecular weight in the range of from about 3,000 to 7,500, per part of mastic.

7. The method of coating tablets and the like which comprises applying to said tablets an initial film coating consisting essentially of from about 13 to 50 parts by weight of a water-soluble polyethlene glycol, having a molecular weight in the range of from about 3,000 to 7,500, per part of mastic; subsequently applying an intermediate film coating consisting essentially of from about 1.2 to 5 parts by weight of cellulose acetate phthalate per part by weight of a water-soluble ethlene oxide polymer having a molecular weight in the range of about 200,000 to 5 million; and subsequently applying a final film coating consisting essentially of from about 13 to 50 parts by weight of a water-soluble polyethlene glycol, having a molecular weight in the range of from about 3,000 to 7,500, per part of mastic.

8. The method of coating tablets and the like which comprises applying at least once to said tablets a first fluid coating composition, said first fluid coating composition consisting essentially of from about 35 to 45% w./v. of a water-soluble polyethlene glycol having a molecular weight in the range of about 3,000 to 7,500, and, from about 0.9 to 2.9% w./v. of matsic, dissolved in a volatile non-aqueous solvent; subsequently repeatedly applying to said tablets a second fluid coating composition, said second fluid coating composition consisting essentially of from about 2 to 3% w./v. of a water-soluble ethylene oxide polymer having a molecular weight in the range of about 200,000 to 5 million and from about 5 to 7% w./v. of cellulose acetate phthalate dissolved in a volatile non-aqueous solvent; and thereafter, at least once applying said first fluid coating composition to the tablets, thereby to form a final coating.

References Cited in the file of this patent

UNITED STATES PATENTS

| 2,881,085 | Endicott et al. | Apr. 7, 1959 |
| 2,957,804 | Shuyler | Oct. 25, 1960 |

FOREIGN PATENTS

| 109,438 | Australia | Jan. 11, 1940 |
| 762,229 | Great Britain | Nov. 28, 1956 |
| 764,342 | Great Britain | Dec. 28, 1956 |

OTHER REFERENCES

Micciche, "La Preparazione di Medicamenti per Uso Orale a Cessione Ritardata Prestabilita" (Oral Medicinal Preparation With Fixed Retardation of Release), Bolletino Chimico Farmaceutico, Milan, vol. 94, pp. 485–493 (1955), abstracted in Chem. Abstracts, vol. 50, No. 7, April 10, 1956; Official Patent Office translation (16 pp.).

Martin et al.: "Remington's Practice of Pharmacy," 11th ed.; pp. 400–419; published 1956, Mack Publishing Co., Easton, Pa.

Jenkins et al.: "Scoville's The Art of Compounding," 9th ed., pp. 75–79; 86–89; 91–92; 105–108; published 1957, McGraw-Hill Book Co., New York, New York.

Chapman et al.: "Physiological Availability of Drugs in Tablets," Canad. Med. Assn. J., vol. 76, pp. 102–106, January 1957.

Dragstedt: "Oral Medication With Preparations for Prolonged Action," J.A.M.A., vol. 168, No. 12, pp. 1652–1655, November 22, 1958.

Martin et al.: "Husa' Pharmaceutical Dispensing," 5th ed., pp. 93–100; 577–590, published 1959, Mack Publishing Co., Easton, Pa.

Lazarus et al.: "Oral Prolonged Action Medicaments: Their Pharmaceutical Control and Therapeutic Aspects," J. Pharm. and Pharmacol., vol. 11, No. 5, pp. 257–290 (pp. 266–271, 277–279, and 285–288 are especially pertinent to In Vivo Tablet Availability of Drugs), May 1959.

Campbell et al.: "Oral Prolonged Action Medication," Practioner, vol. 183, pp. 758–765, December 1959.

Gross et al.: "Transformulation to Filmcoating," Drug and Cosmetic Industry, vol. 86, No. 2, pages 170–171, 264, 288–291, February 1960.